(12) United States Patent
Wu et al.

(10) Patent No.: US 12,510,800 B2
(45) Date of Patent: Dec. 30, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Yi-Ho Chen, Taoyuan (TW); Ying-Jen Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 375 days.

(21) Appl. No.: 18/146,067

(22) Filed: Dec. 23, 2022

(65) Prior Publication Data

US 2023/0204899 A1    Jun. 29, 2023

Related U.S. Application Data

(60) Provisional application No. 63/266,034, filed on Dec. 27, 2021.

(51) Int. Cl.

| | |
|---|---|
| *G02B 7/08* | (2021.01) |
| *G02B 26/08* | (2006.01) |
| *G02B 27/00* | (2006.01) |
| *G02B 27/64* | (2006.01) |
| *G03B 5/00* | (2021.01) |
| *H04N 23/51* | (2023.01) |

(Continued)

(52) U.S. Cl.
CPC ............... *G03B 5/00* (2013.01); *G02B 7/08* (2013.01); *G02B 26/08* (2013.01); *G02B 27/0006* (2013.01); *G02B 27/646* (2013.01); *H04N 23/55* (2023.01); *H04N 23/6812* (2023.01); *H04N 23/687* (2023.01); *G03B 2205/0015* (2013.01); *G03B 2205/0069* (2013.01); *H02K 41/0354* (2013.01); *H04N 23/51* (2023.01)

(58) Field of Classification Search
CPC .... G03B 5/00; G03B 2205/0015; G03B 5/06; G03B 2205/0069; G03B 3/10; G03B 30/00; G02B 7/08; G02B 26/08; G02B 27/642; G02B 27/646; G02B 13/0065; G02B 13/007; G02B 5/005; G02B 7/04; H02K 41/0354; H04N 23/51; H04N 23/55; H04N 23/687; H04N 23/00; H04N 23/54; B06B 1/06; B60S 1/60; B60R 11/00
USPC .......................................................... 359/823
See application file for complete search history.

(56) References Cited

U.S. PATENT DOCUMENTS

| | | | | |
|---|---|---|---|---|
| 10,656,431 B2 * | 5/2020 | Hu | ........................ | G02B 7/09 |
| 2016/0238834 A1 * | 8/2016 | Erlich | ................. | G02B 26/101 |
| 2020/0400464 A1 * | 12/2020 | Yedid | ..................... | H04N 23/58 |

FOREIGN PATENT DOCUMENTS

| | | |
|---|---|---|
| CN | 216013776 U | 3/2022 |
| KR | 20200055240 A * | 5/2020 |

OTHER PUBLICATIONS

Chinese Office Action issued in corresponding Chinese Application No. 202223501330.8 issued on May 11, 2023, 1 page.

* cited by examiner

*Primary Examiner* — William R Alexander
*Assistant Examiner* — Alaina Marie Swanson
(74) *Attorney, Agent, or Firm* — MUNCY, GEISSLER, OLDS & LOWE, P.C.

(57) ABSTRACT

An optical element driving mechanism used for driving a first optical element is provided. The optical element driving mechanism includes a fixed portion and a first driving assembly. The first optical element is movable relative to the fixed portion. The first driving assembly is used for driving the first optical element to move relative to the fixed portion.

18 Claims, 15 Drawing Sheets

(51) Int. Cl.
*H04N 23/55* (2023.01)
*H04N 23/68* (2023.01)
*H02K 41/035* (2006.01)

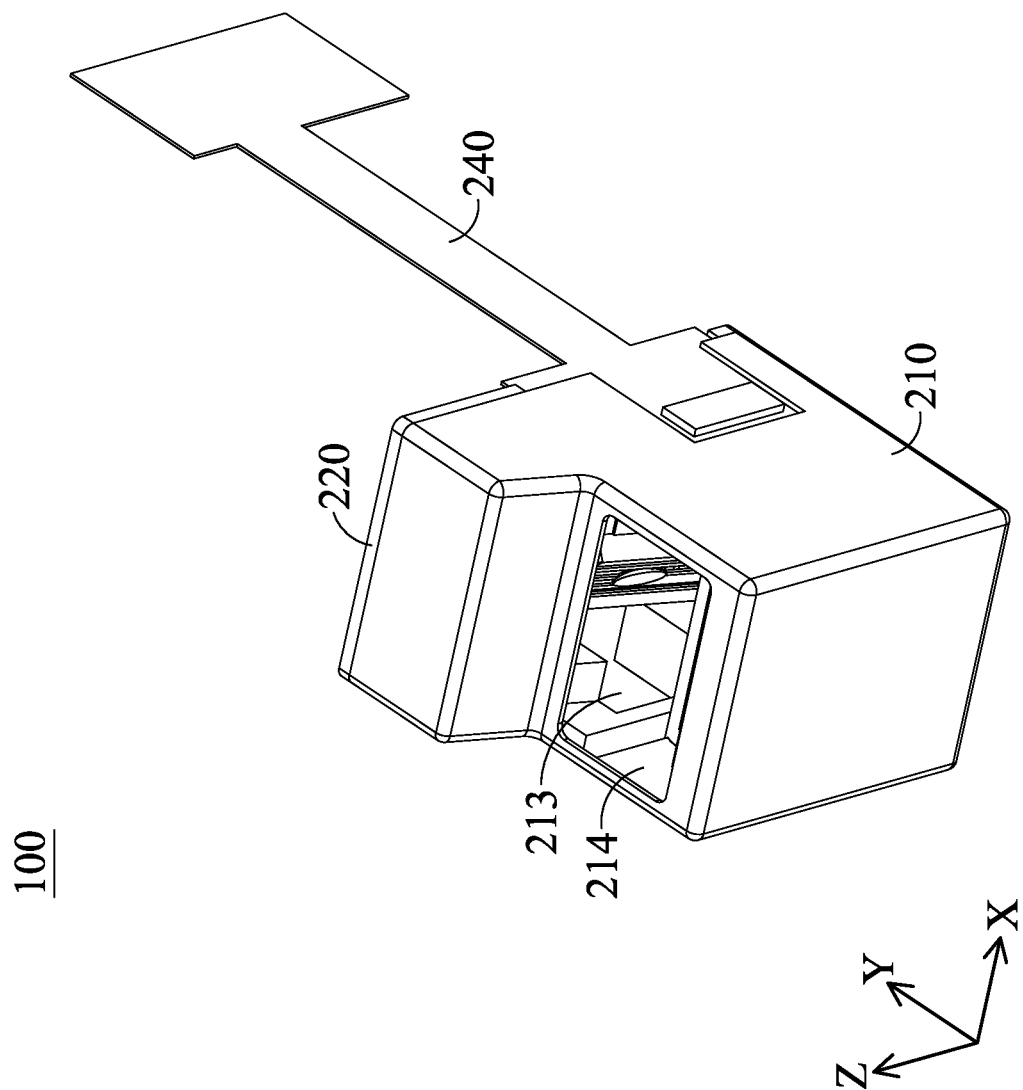

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism is provided and used for driving a first optical element in some embodiments of the present disclosure. The optical element driving mechanism includes a fixed portion and a first driving assembly. The first optical element is movable relative to the fixed portion. The first driving assembly is sued for driving the first optical element to move relative to the fixed portion.

In some embodiments, the fixed portion includes a first surface and a second surface, wherein the first surface and the second surface face different direction. A light travels along a first axis and incident into the optical element driving mechanism through a first opening of the first surface. The light travels along a second axis and exit the optical element driving mechanism through a second opening of the second surface.

In some embodiments, the first axis and the second axis are not parallel. The first axis does not intersect the second axis. The first axis passes through a center of the first opening. The second axis passes through a center of the second opening. When viewed in a first direction, the first opening and the second opening at least partially overlap each other.

In some embodiments, when viewed in a second direction, the first opening and the second opening do not overlap each other. The second direction is not parallel to the second axis. The second direction is perpendicular to the second axis. The first opening and the second opening have different areas. The first surface has a planar structure. The second surface has a planar structure. The first surface and the second surface are perpendicular.

In some embodiments, the fixed portion further includes an extension portion protruding from the second surface, a case having an accommodating space, a bottom disposed in the accommodating space and affixed on the case, and a frame disposed in the accommodating space and affixed on the case.

In some embodiments, the first opening is less than the second opening. The extension portion is adjacent to the second opening. The extension portion includes a dodging portion corresponding to the second opening. The dodging portion has a shrinking structure. The first surface extends to the extension portion. The case includes metal. The bottom includes plastic. The frame includes plastic.

In some embodiments, the frame or the bottom includes a connection strengthening portion corresponding to the bottom or the frame. The connection strengthening portion has a shrinking structure. The connection strengthening portion includes a connection strengthening surface facing the bottom or the frame. The connection strengthening surface is not parallel to the first surface. The connection strengthening surface is not perpendicular to the first surface. The connection strengthening surface is not parallel to the second surface. The connection strengthening surface is not perpendicular to the second surface.

In some embodiments, the connection strengthening surface is not parallel to a third axis. The third axis is parallel to the second direction. The connection strengthening surface is not perpendicular to the third axis.

In some embodiments, at least a portion of the bottom is disposed in the extension portion. The frame is not disposed in the extension portion. The bottom includes a third opening corresponding to the first opening. The third opening has a closed structure.

In some embodiments, the optical system further including a first optical element movable relative to the fixed portion in a first dimension, a second optical element movable relative to the fixed portion in a second dimension, and a second driving assembly used for driving the second optical to move relative to the fixed portion.

In some embodiments, the first dimension and the second dimension are different. When viewed in a third direction, a connection between a center of the first optical element and a center of the second optical element is not parallel to the third axis. The third direction is parallel to the first axis. When viewed in the third direction, the connection between the center of the first optical element and the center of the second optical element is not perpendicular to the third axis.

In some embodiments, the first driving assembly is disposed on the bottom. The second driving assembly is disposed on the frame. The first driving assembly is not disposed on the frame. The second driving assembly is not disposed on the bottom. At least a portion of the first driving assembly is disposed on the extension portion.

In some embodiments, the first dimension is a rotational movement taking a first rotational axis as the rotational axis. The second dimension is a rotational movement taking a second rotational axis as the rotational axis. The first rotational axis and the second rotational axis are not parallel. The first rotational axis and the first axis are not parallel. The first rotational axis and the second axis are not parallel. The first rotational axis and the third axis are not parallel. The second rotational axis and the first axis are parallel.

In some embodiments, the first driving assembly includes a first coil and a first magnetic element corresponding with each other. The second driving assembly includes a second coil and a first magnetic element corresponding with each other. The first magnetic element is movable relative to the second magnetic element. The first magnetic element is not movable relative to the second coil, or the first coil is not movable relative to the second magnetic element.

In some embodiments, the optical system further includes a resilient assembly and a support assembly. The first optical element is movably connected to the fixed portion through the resilient assembly. The second optical element is movably connected to the fixed portion through the support assembly.

In some embodiments, the first rotational axis and the second rotational axis are perpendicular. The first driving assembly further includes a first magnetic permeable element and a third magnetic element. The second driving assembly further includes a second magnetic permeable element. The first magnetic permeable element and the second magnetic permeable element are not movable with each other. The first magnetic permeable element is affixed on the first magnetic element. The second magnetic permeable element is affixed on the second coil. The third magnetic element corresponds to the first coil.

In some embodiments, a space is between the first magnetic element and the third magnetic element, and the space corresponds to the second magnetic element. The first magnetic element is affixed on the fixed portion. The first optical element is movable relative to the fixed portion through a resilient portion of the resilient assembly. The resilient portion is flexible. A first fixed end of the resilient assembly is affixed on the first optical element. A second fixed end of the resilient assembly is affixed on the fixed portion. The support assembly is movable relative to the second optical element or the fixed portion.

In some embodiments, the first driving assembly drives the first optical element relative to the fixed portion in a first frequency. The second driving assembly drives the second optical element relative to the fixed portion in a second frequency range. A maximum value of the second frequency range is less than the first frequency.

In some embodiments, a first distance is between the center of the first opening and the center of the first optical element. A second distance is between the center of the second opening and the center of the second optical element. A third distance is between the center of the first optical element and the center of the second optical element. The first distance and the second distance are different. The first distance and the third distance are different. The second distance and the third distance are different. The light sequentially passes through the first opening, the first optical element, the second optical element, and the second opening.

In some embodiments, the first frequency is at least 10 times greater than the maximum value of the second frequency range. The first distance is greater than the second distance. The first distance is greater than the third distance. The second distance is greater than the third distance.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 1A, FIG. 1B, FIG. 1C, and FIG. 1D are schematic views of an optical element driving mechanism viewed from different directions in some embodiments of the present disclosure.

DETAILED DESCRIPTION OF THE INVENTION

Figure 1A:
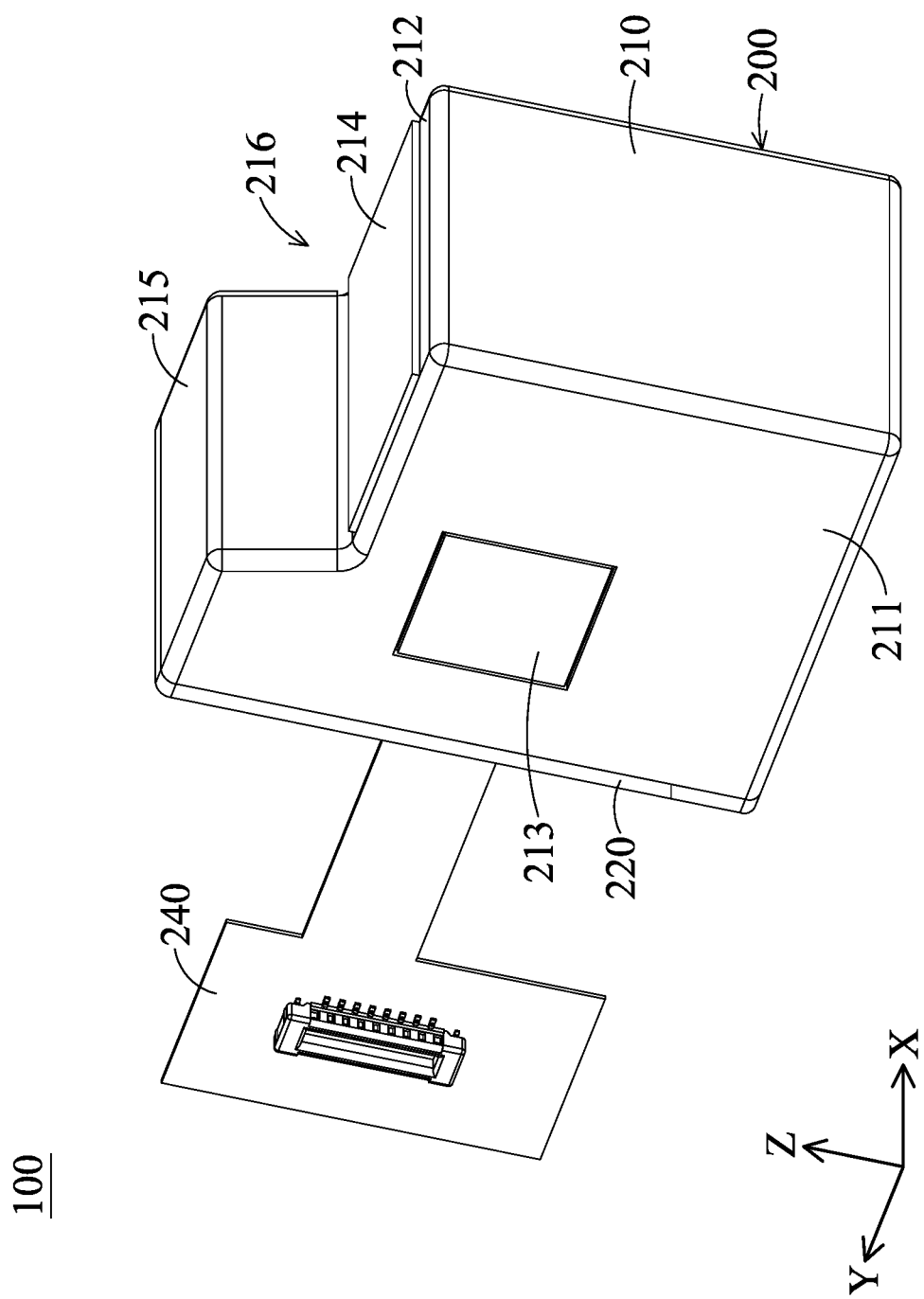

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
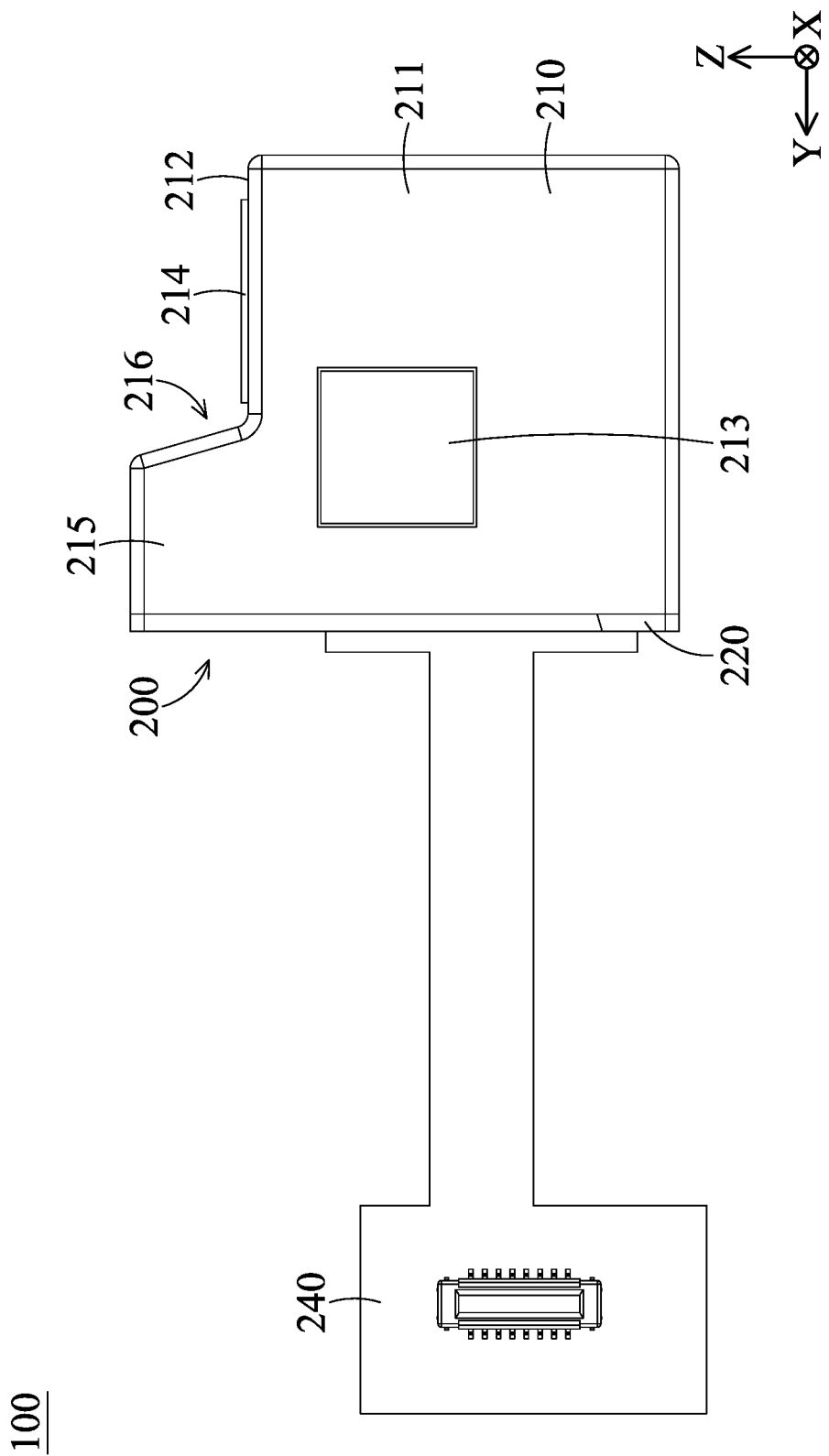
Figure 1C:
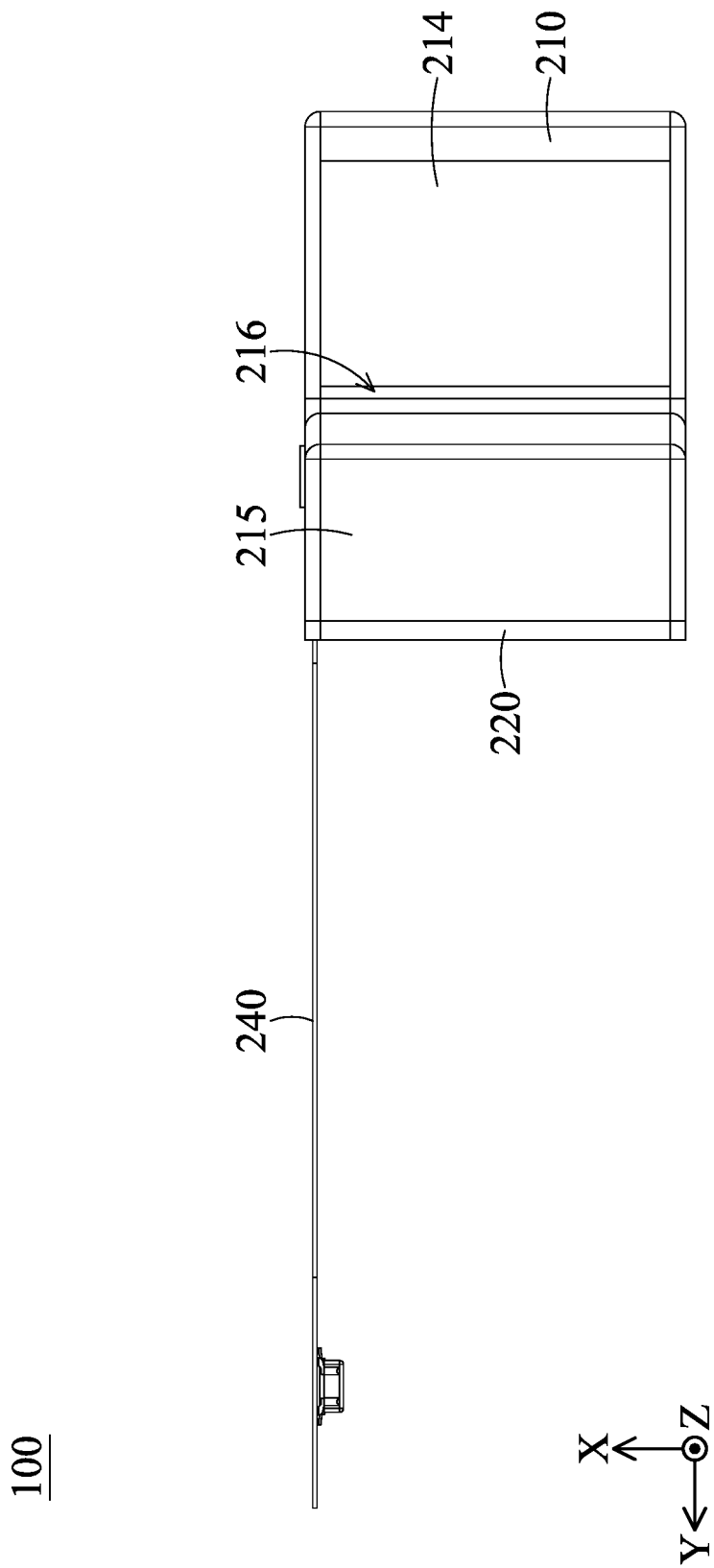
Figure 2:
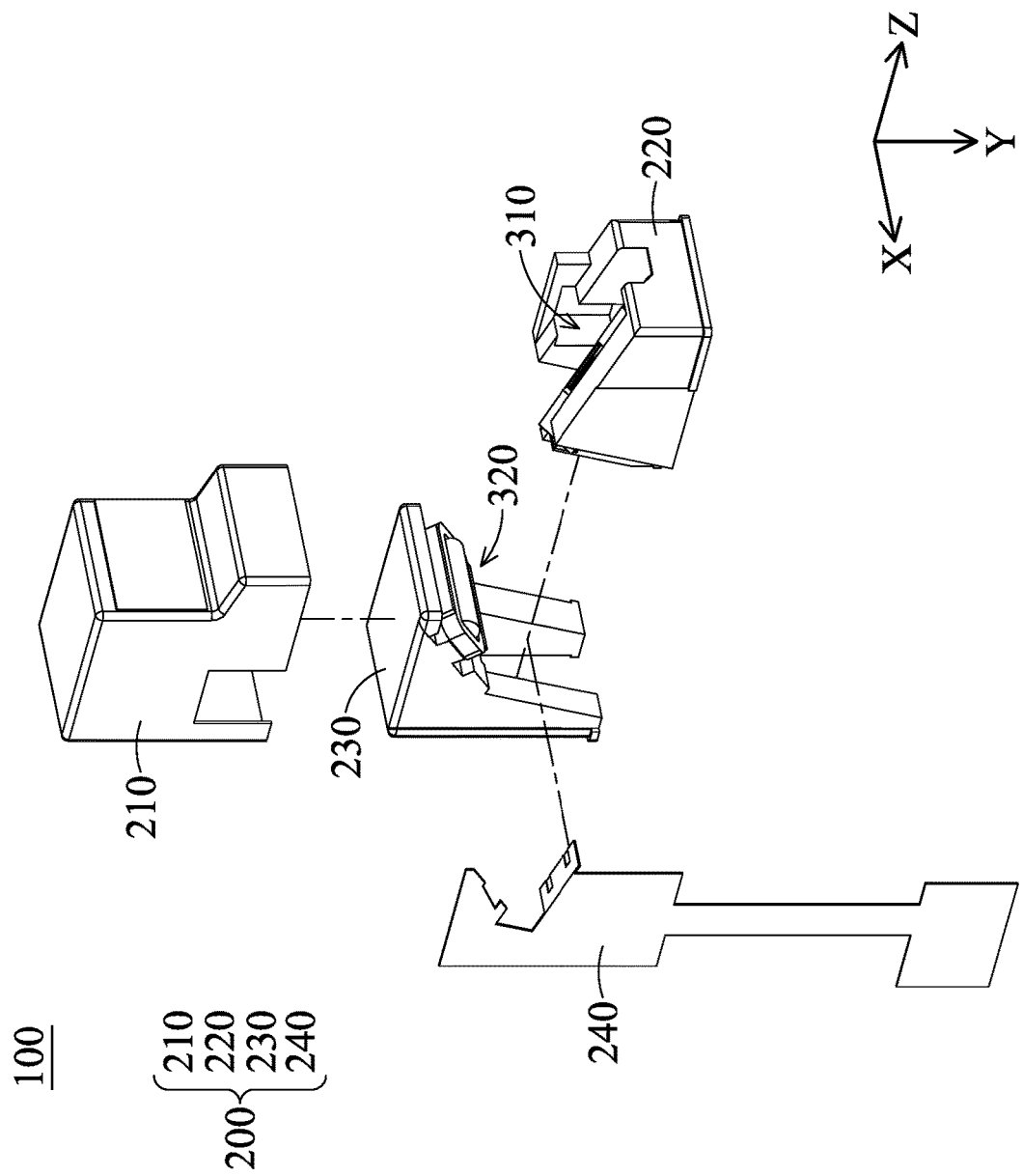
FIG. 2 is an exploded view of the optical element driving mechanism.

FIG. 1A, FIG. 1B, FIG. 1C, and FIG. 1D are schematic views of an optical element driving mechanism 100 viewed from different directions in some embodiments of the present disclosure. FIG. 2 is an exploded view of the optical element driving mechanism 100. As shown in FIG. 1A to FIG. 2, the optical element driving mechanism 100 may mainly include a fixed portion 200 (including a case 210, a bottom 220, a frame 230, and a circuit element 240) and a first driving assembly 310 and a second driving assembly 320 disposed on the fixed portion 200.

In some embodiments, the optical element driving mechanism 100 may be used for driving a first optical element 330 and a second optical element 340 to move relative to the fixed portion 200. In particular, the first driving assembly 310 may be used for driving the first optical element 330 to move relative to the fixed portion 200, and the second driving assembly 320 may be used for driving the second optical element 340 to move relative to the fixed portion 200.

In some embodiments, the case 210 may include a first surface 211 and a second surface 212, and the first surface 211 and the second surface 212 have planar structures and may face different directions (e.g. the first surface 211 and the second surface 212 may be perpendicular). A first opening 213 may be formed on the first surface 211, and a second opening 214 may be formed on the second surface 212.

As shown in FIG. 1D, when viewed in a first direction (e.g. a direction that is not parallel to the X, Y, and Z directions), the first opening 213 and the second opening 214 may at least partially overlap with each other. Moreover, as shown in FIG. 1B, when viewed in a second direction (e.g. the X direction), the first opening 213 and the second opening 214 do not overlap with each other. It should be noted that the second direction is not parallel to a second axis 420, such as they may be perpendicular. In some embodiments, the first opening 213 and the second opening 214 may have different areas, such as the area of the first opening 213 may be less than the area of the second opening 214 to prevent light from escaping, and the area of detection or scanning may be increased.

In some embodiments, the case 210 may further include an extension portion 215 extending from the second surface 212, the first surface 211 may extend to the extension portion 215, the extension portion 215 may be adjacent to the second opening 214, and the extension portion 215 may have a dodging portion 216. In some embodiments, the dodging portion 216 may have a shrinking structure (e.g. it may have a surface not parallel no perpendicular to the second opening 214) and correspond to the second opening 214 to dodge the light exit from the second opening 214, so the range of detection and scanning may be increased. In some embodiments, at least a portion of the bottom 220 may be disposed in the extension portion 215, and the frame 230 is not disposed on the extension portion 215.

Moreover, an accommodating space 217 may be formed on the case 210, and the bottom 220 and the frame 230 may be disposed in the accommodating space 217 and affixed on the case 210. In some embodiments, the case 210 may include metal, and the bottom 220 and the frame 230 may include plastic, so the case 210 may protect other elements of the optical element driving mechanism 100.

Figure 3A:
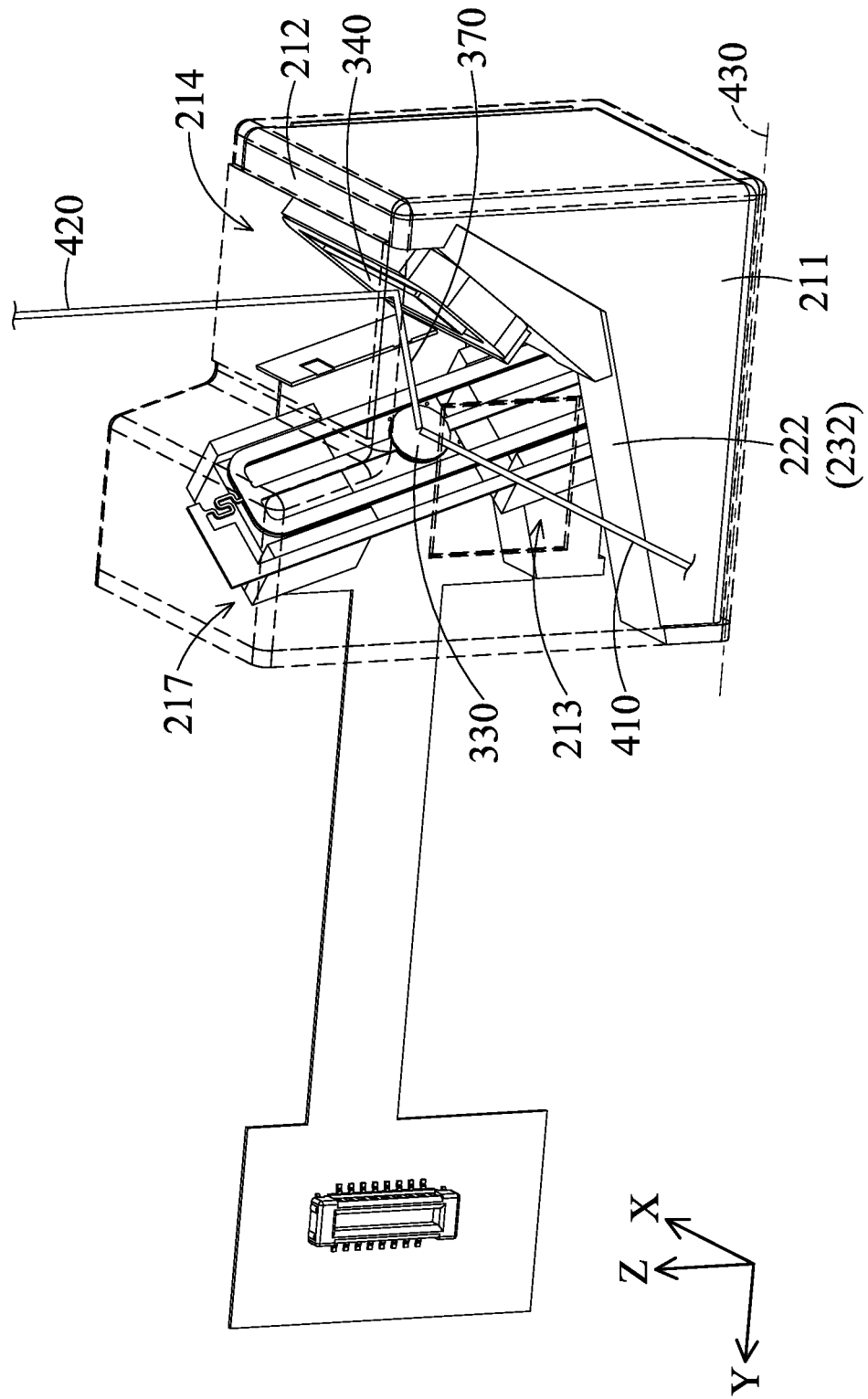
FIG. 3A, FIG. 3B, and FIG. 3C are schematic views of the optical element driving mechanism viewed in different directions when the optical element driving mechanism is operating.
Figure 3B:
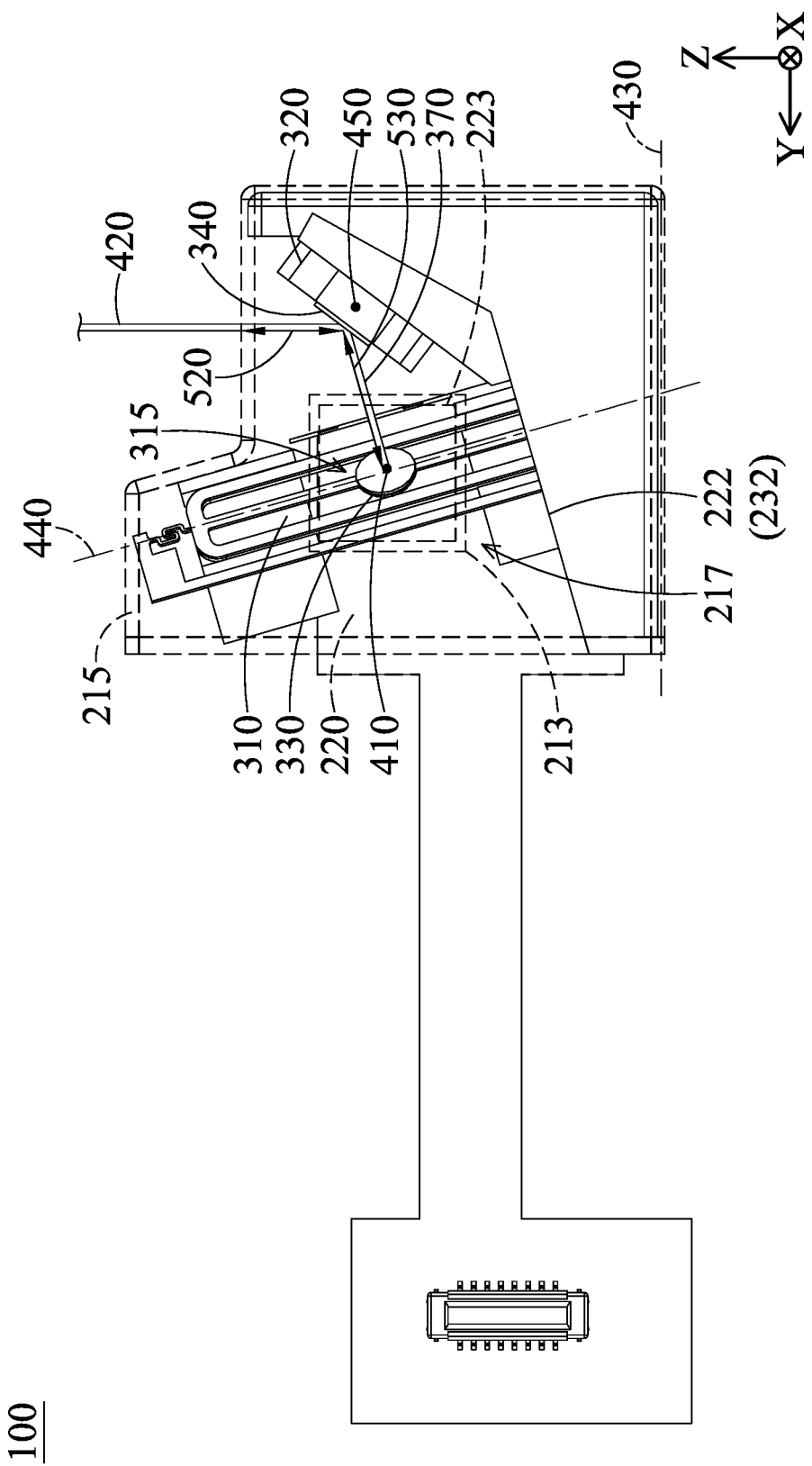
Figure 3C:
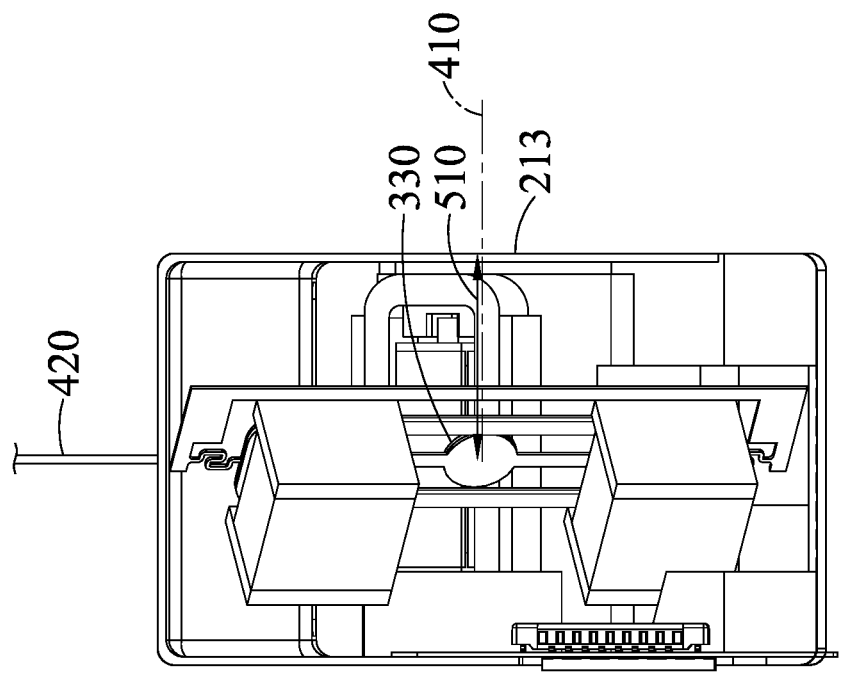

FIG. 3A, FIG. 3B, and FIG. 3C are schematic views of the optical element driving mechanism 100 viewed in different directions when the optical element driving mechanism 100 is operating. In particular, light may enter the optical element driving mechanism 100 through a first axis 410 from the first opening 213 and sequentially be reflected by the first optical element 330 and the second optical element 340, and then exit the optical element driving mechanism 100 through the second axis 420 from the second opening 214. Alternatively, the light may travel in the opposite direction as well. In some embodiments, the first axis 410 may pass through the center of the first opening 213, and the second axis 420 may pass through the center of the second opening 214. It should be noted that the first axis 410 and the second axis 420 are not parallel or intersect with each other. In other words, the optical element driving mechanism 100 may be used for changing the path of the light. In some embodiments, transparent protection elements (e.g. glass or plastic) may be disposed on the first opening 213 and the second opening 214 to protect other elements in the optical element driving mechanism 100.

In some embodiments, as shown in FIG. 3B and FIG. 3C, a first distance 510 is between the center of the first opening 213 and the center of the first optical element 330, a second distance 520 is between the center of the second opening 214 and the center of the second optical element 340, and a third distance 530 is between the center of the first optical element 330 and the center of the second optical element 340. The first distance 510, the second distance 520, and the third distance 530 may be different, such as the first distance 510 may be greater than the second distance 520, and the second distance 520 may be greater than the third distance 530. Since the second distance 520 is less than the first distance 510, the detecting or scanning range of the optical element driving mechanism 100 may be increased. The image received may deform if the second distance 520 is too large. In some embodiments, as shown in FIG. 3B, when viewed in a third direction parallel to the first axis 410, a connection 370 between a center of the first optical element 330 and a center of the second optical element 340 is not parallel or perpendicular to the third axis 430.

Figure 4A:
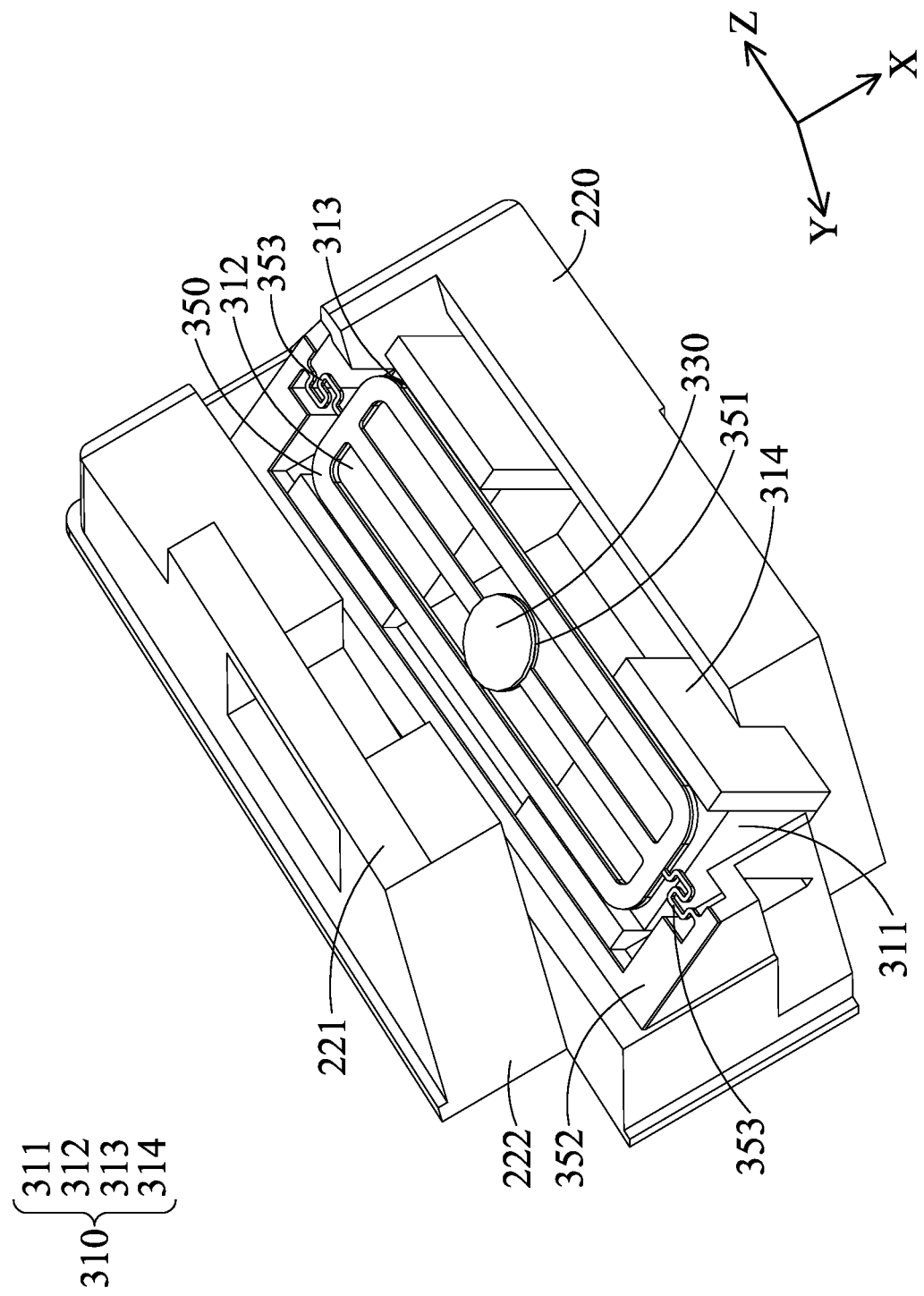
FIG. 4A, FIG. 4B, and FIG. 4C are schematic views of some elements of the optical element driving mechanism.
Figure 4B:
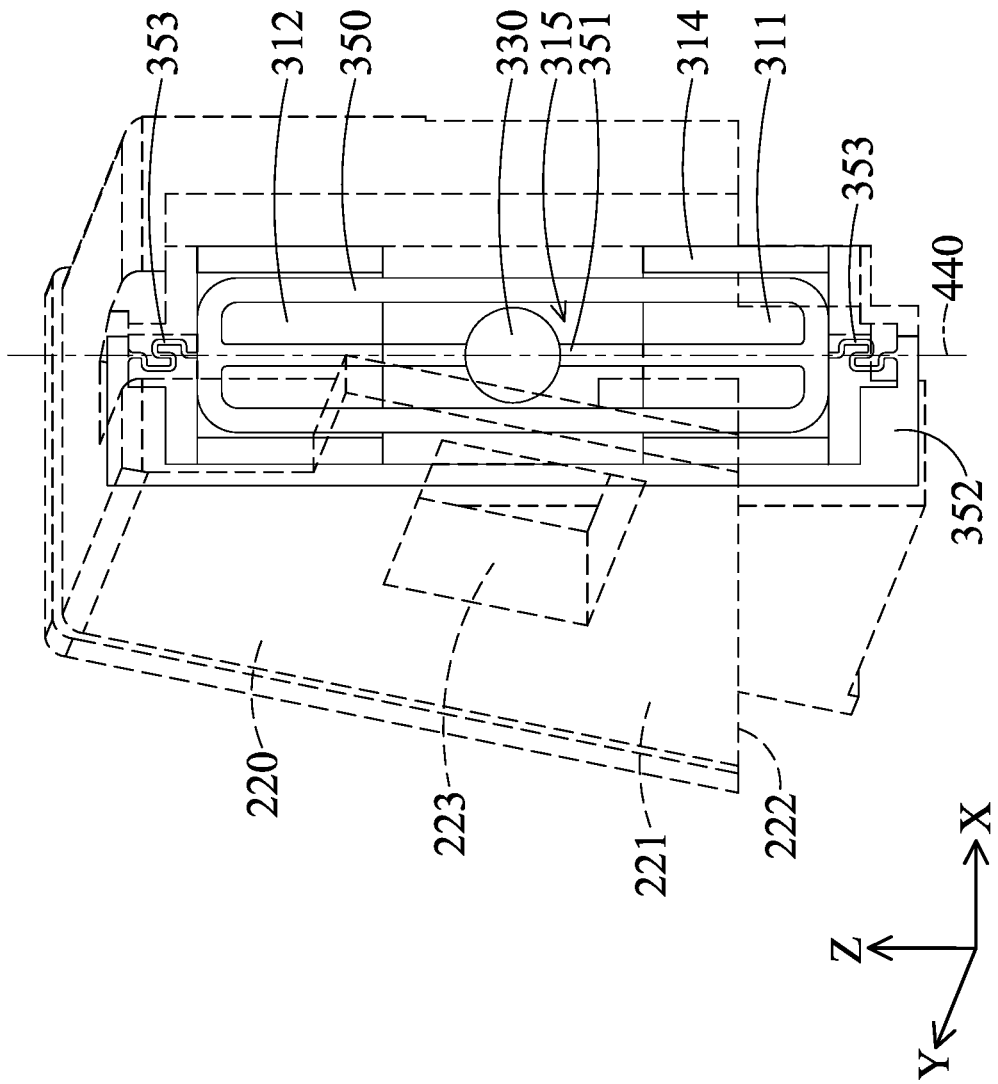
Figure 4C:
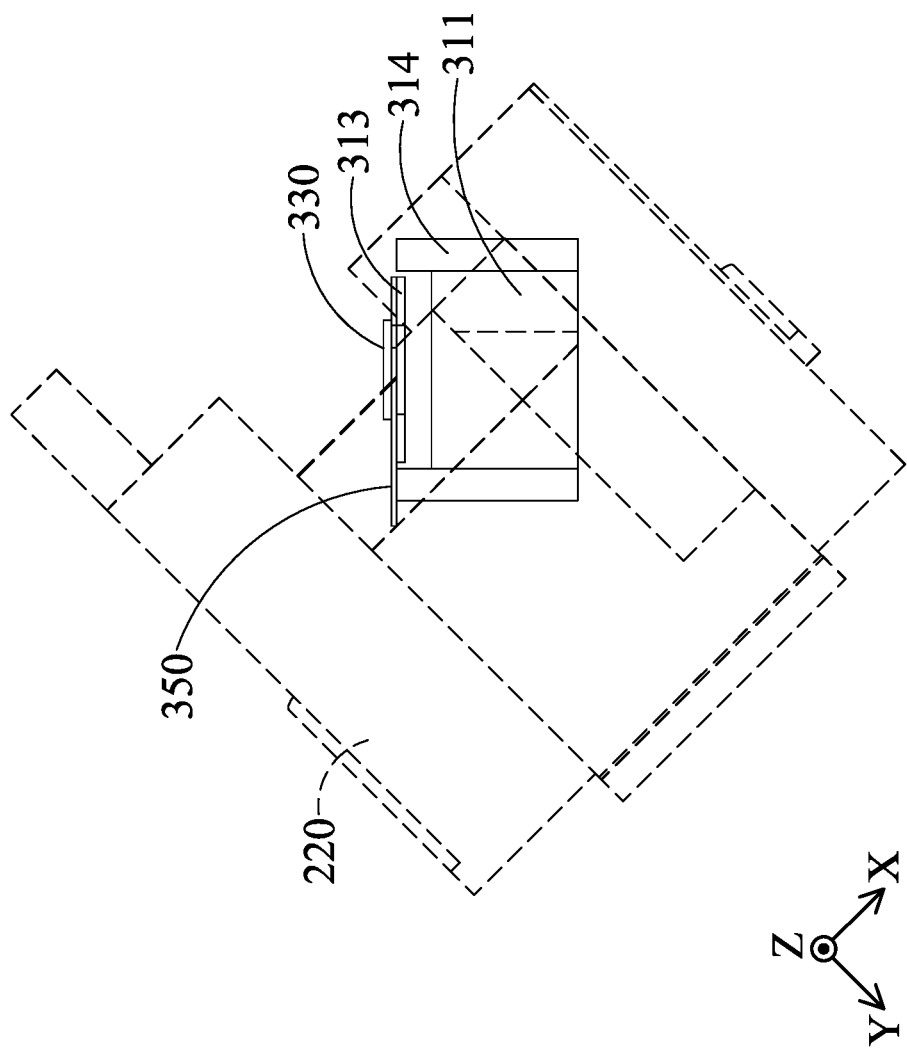

FIG. 4A, FIG. 4B, and FIG. 4C are schematic views of some elements of the optical element driving mechanism 100, which mainly show the bottom 220 and the elements disposed on the bottom 220. As shown in FIG. 4A to FIG. 4C, the bottom 220 may have a connection strengthening portion 221 corresponding to the frame 230. The connection strengthening portion 221 has a shrinking structure and has a connection strengthening surface 222 facing the frame 230 and in contact with the frame 230. The connection strengthening surface 222 is not perpendicular or parallel to the first surface 211 and the second surface 212. In some embodiments, the third axis 430 may extend in the Y direction, the connection strengthening surface 222 and the third axis 430 are not parallel or perpendicular, and the third axis 430 is parallel to the second direction (the Y direction).

In some embodiments, the bottom 220 may have a third opening 223 corresponding to the first opening 213, such as at least partially overlap with each other in the X direction. In some embodiments, the third opening 223 may have a closed structure.

The first driving assembly 310 may be disposed on the bottom 220 and is not disposed on the frame 230. The first driving assembly 310 may include a first magnetic element 311, a third magnetic element 312, a first coil 313, and a first magnetic permeable element 314. The resilient assembly 350 may be disposed on the first driving assembly 310 (e.g. on the first coil 313), and the first optical element 330 may be disposed on the resilient assembly 350 to movably connected to the fixed portion 200 through the resilient assembly 350. In some embodiments, the first axis 410 may be used for driving the first optical element 330 to move in a first dimension (e.g. rotation taking the first rotational axis 440 as the rotational axis), so the point light incident from the first opening 213 may be reflected by the first optical element 330 to be linear light. In some embodiments, the first rotational axis 440 may not be parallel to the first axis 410, the second axis 420, and the third axis 430.

In some embodiments, the first optical element 330 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the first magnetic element 311 and the third magnetic element 312 may correspond to the first coil 313, and a space 315 may be between the first magnetic element 311 and the third magnetic element 312 and correspond to the second magnetic element 321 (e.g. at least partially overlap in the Y direction) to prevent interference between the magnetic elements. In some embodiments, the first magnetic element 311 and the third magnetic element 312 may affix on the bottom 220. The resilient assembly 350 may have a first fixed end 351, a second fixed end 352, and a resilient portion 353. The first fixed end 351 may affix on the first optical element 330, and the second fixed end 352 may affix on the fixed portion 200 (e.g. the bottom 220).

In some embodiments, the resilient portion 353 may be flexible, so the first optical element 330 may be driven by the first driving assembly 310 to move relative to the fixed portion 200 through the resilient portion 353. For example, the first optical element 330 may move by resonance. In some embodiments, the first driving assembly 310 may drive the first optical element 330 to move relative to the fixed portion 200 in a first frequency.

In some embodiments, the first magnetic permeable element 314 may affix on the first magnetic element 311 and the third magnetic element 312 and may include metal, so the first magnetic permeable element 314 may control the magnetic field emitted from the first magnetic element 311 and the third magnetic element 312. Since the first coil 313 with lighter weight is disposed on the resilient assembly 350, resonance may be facilitated, so advantages like light weight, energy saving and increasing the driving frequency may be achieved.

Figure 5A:
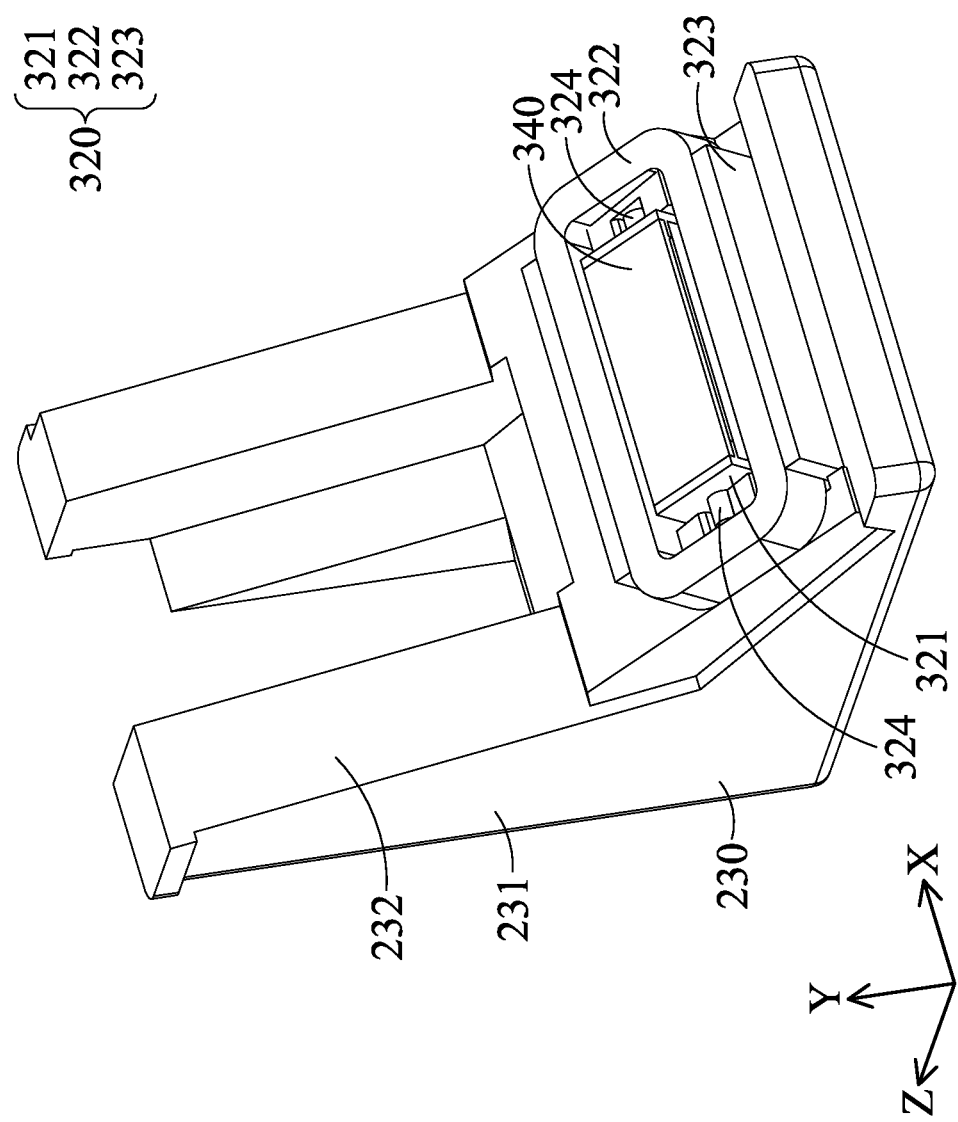
FIG. 5A, FIG. 5B, and FIG. 5C are schematic views of some elements of the optical element driving mechanism.
Figure 5B:
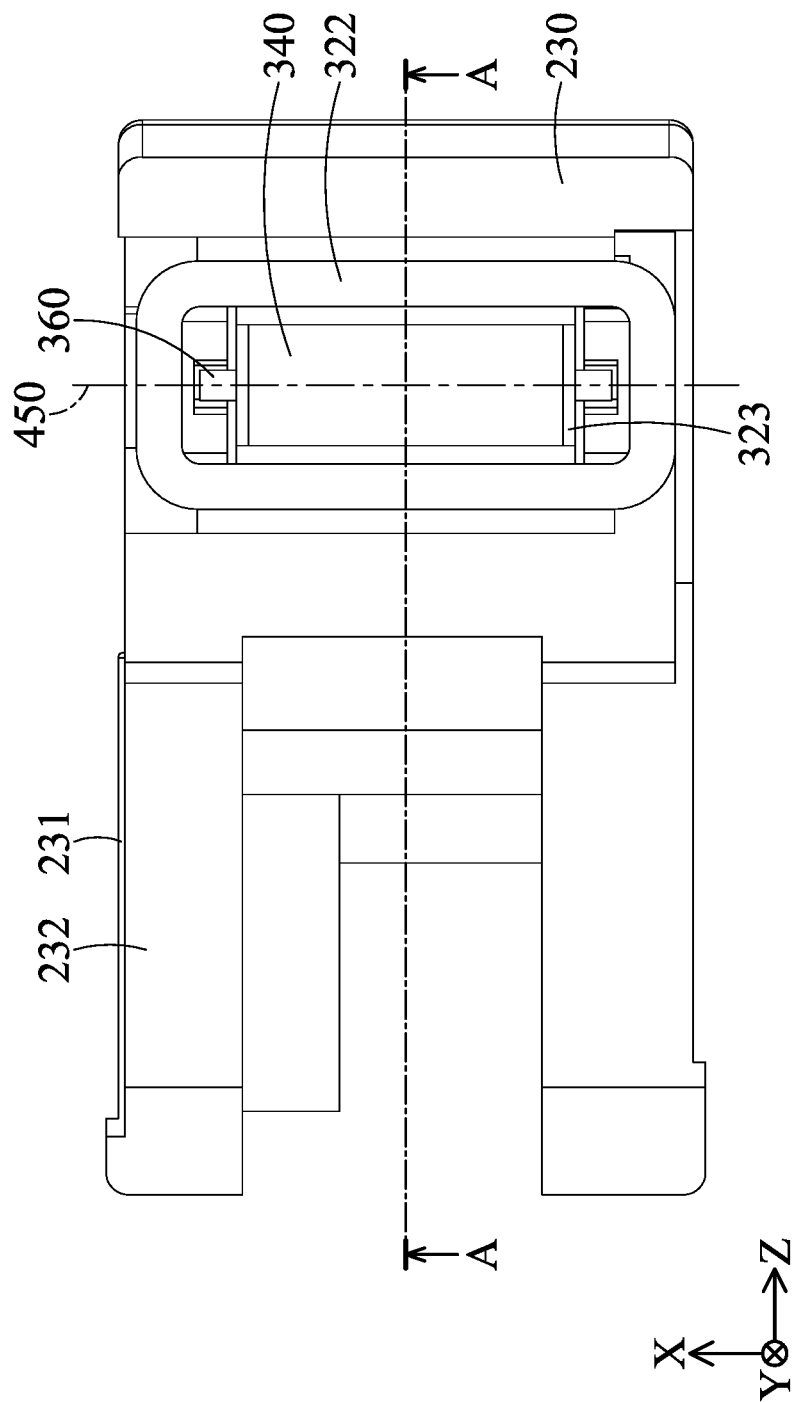
Figure 5C:
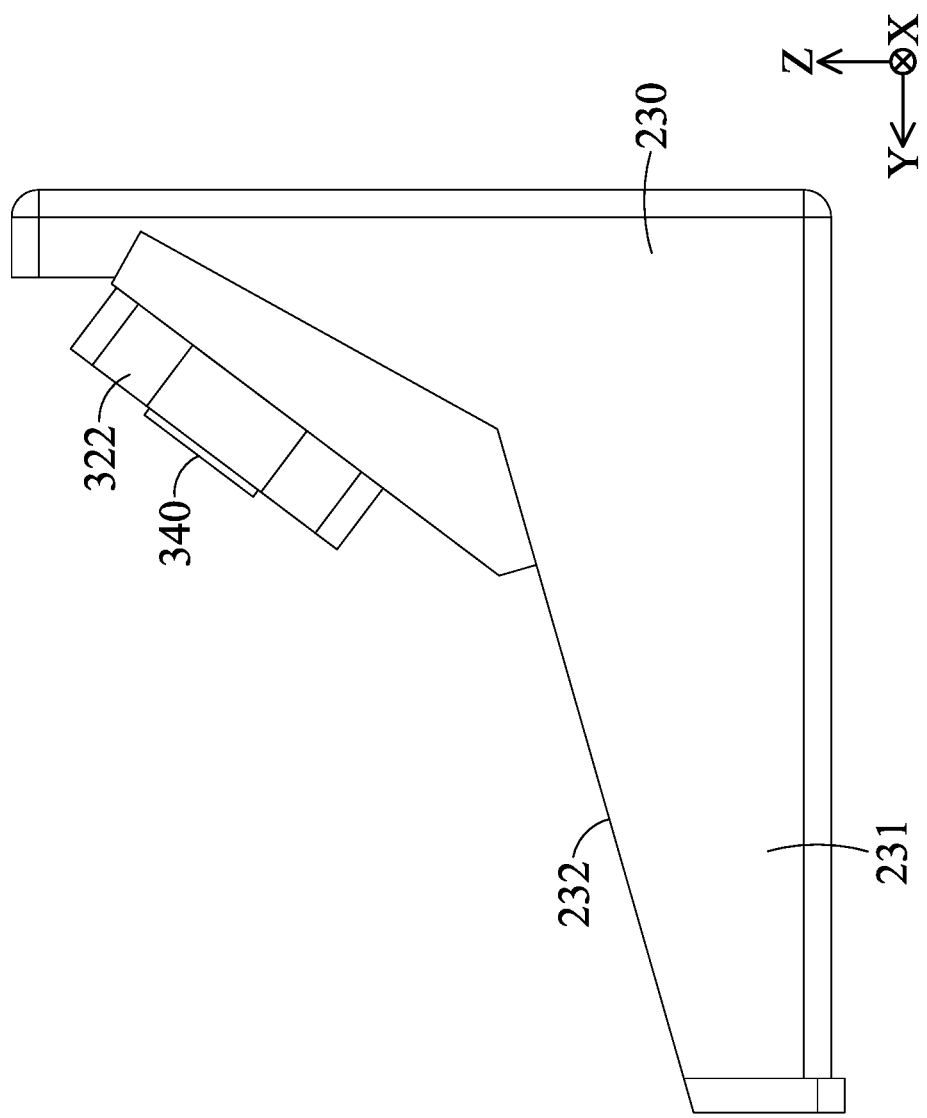
Figure 5D:
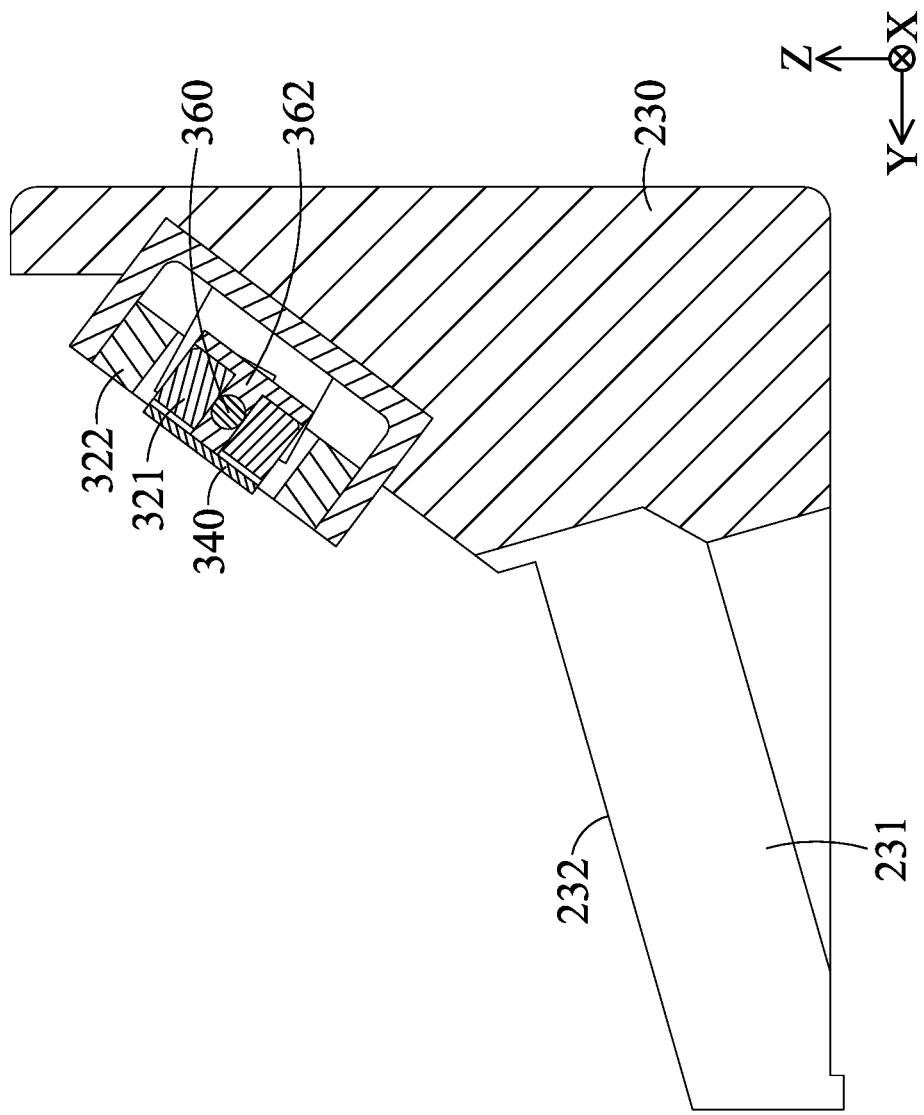
FIG. 5D is a cross-sectional view illustrated along a line A-A in FIG. 5B.

FIG. 5A, FIG. 5B, and FIG. 5C are schematic views of some elements of the optical element driving mechanism 100, which mainly show the frame 230 and elements disposed on the frame 230. FIG. 5D is a cross-sectional view illustrated along a line A-A in FIG. 5B. As shown in FIG. 5A to FIG. 5D, the second driving assembly 320 may be disposed on the frame 230 and does not disposed on the bottom 220. For example, the second driving assembly 320 may include a second magnetic element 321, a second coil 322, and a second magnetic permeable element 323. The second magnetic permeable element 323 may affix on the second coil 322, and the second coil 322 may affix on the frame 230. In other words, the first magnetic element 311 and the second coil 322 cannot move relative each other. However, the present disclose is not limited thereto. For example, the positions of the magnetic elements and the coils may be interchanged to make the first coil and the second magnetic element cannot move relative with each other (not shown). In some embodiments, the first magnetic permeable element 314 and the second magnetic permeable element 323 cannot move relative with each other.

In some embodiments, the second magnetic element 321 may correspond to the second coil 322 and may move relative to the fixed portion 200 or the first magnetic element 311, so an electromagnetic driving force may be generated to move the second optical element 340 relative to the fixed portion 200. The second optical element 340 may be disposed on the movable portion 362, and the movable portion 362 may be disposed on the support assembly 360. The support assembly 360 may move relative to the second optical element 340, the movable portion 362, and the fixed portion 200 to allow the second optical element 340 movably connecting to the fixed portion 200 through the movable portion 362.

In some embodiments, the second driving assembly 320 may move the second optical element 340 relative to the fixed portion 200 in a second dimension (e.g. rotation taking the second axis 420 as the rotational axis) by resonance within a second frequency range. In some embodiments, the maximum value of the second frequency range is less than the first frequency. For example, the first frequency may be more than 10 times of the maximum value of the second frequency range. In some embodiments, the first frequency may have a frequency of about 1 2000 Hz, and the second frequency range may be between about 1 Hz and about 1000 Hz to allow movement with higher frequency in specific directions, so functions like projection, scanning, and detection may be achieved.

In some embodiments, the first dimension and the second dimension are different, such as the second dimension may be a rotation taking the second rotational axis 450 as the rotational axis. In some embodiments, the second magnetic element 321 may movably connect to the frame 230 through the support assembly 360, and an axis extending through the support assembly 360 may be defined as the second rotational axis 450. The second rotational axis 450 and the first axis 410 may be parallel. The first rotational axis 440 and the second rotational axis 450 may be not parallel to allow the first optical element 330 and the second optical element 340 rotating in different dimensions. Therefore, when point light is incident to the first optical element 330 through the first opening 213, the point light may be converted to linear light and provided to the second optical element 340 since the first optical element 330 moves in the first dimension. The movement of the second optical element 340 in the second dimension may allow the linear light convert to planar light and exit from the second opening 214, so the optical element driving mechanism 100 may achieve projection function. On the other hand, of planar light enters the optical element driving mechanism 100 through the second opening 214, it may be converted to point light by similar principle, so functions like scanning or detection may be achieved.

In some embodiments, the frame 230 may have a connection strengthening portion 231, the connection strengthening portion 231 may have a connection strengthening surface 232, and the connection strengthening surface 232 faces the connection strengthening surface 222 of the bottom 220. For example, the connection strengthening surface 222 may in contact with the connection strengthening surface 232 to strengthen the connection between the bottom 220 and the frame 230. The connection strengthening surface 232 is not perpendicular or parallel to the first surface 211 and the second surface 212. In some embodiments, the connection strengthening surface 232 and the third axis 430 are not parallel or perpendicular.

In summary, an optical element driving mechanism used for driving a first optical element is provided. The optical element driving mechanism includes a fixed portion and a first driving assembly. The first optical element is movable relative to the fixed portion. The first driving assembly is used for driving the first optical element to move relative to the fixed portion. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system used for driving a first optical element, comprising:
   a fixed portion comprising a frame, a bottom, a first surface, and a second surface, wherein the first optical element is movable relative to the fixed portion, and the frame or the bottom comprises a connection strengthening portion corresponding to the bottom or the frame; and
   a first driving assembly used for driving the first optical element to move relative to the fixed portion;
   wherein:
   a light travels along a first axis and incidents into the optical system through a first opening of the first surface;
   the light travels along a second axis and exits the optical system through a second opening of the second surface;
   the connection strengthening portion has a shape that gradually shrinks;
   the connection strengthening portion comprises a connection strengthening surface facing the bottom or the frame;
   the connection strengthening surface is not parallel to the first surface;
   the connection strengthening surface is not perpendicular to the first surface;
   the connection strengthening surface is not parallel to the second surface;
   the connection strengthening surface is not perpendicular to the second surface;
   the connection strengthening surface is not parallel or perpendicular to a third axis;
   the third axis is parallel to a second direction; and
   the second direction is perpendicular to the second axis.

2. The optical system as claimed in claim 1, wherein:
   the first surface and the second surface face different directions.

3. The optical system as claimed in claim 2, wherein:
   the first axis and the second axis are not parallel;
   the first axis does not intersect the second axis;
   the first axis passes through a center of the first opening;
   the second axis passes through a center of the second opening; and
   when viewed in a first direction, the first opening and the second opening at least partially overlap each other.

4. The optical system as claimed in claim 3, wherein:
   when viewed in the second direction, the first opening and the second opening do not overlap each other;
   the first opening and the second opening have different areas;
   the first surface has a planar structure;
   the second surface has a planar structure; and
   the first surface and the second surface are perpendicular.

5. The optical system as claimed in claim 4, wherein:
   the fixed portion further comprises:
   an extension portion protruding from the second surface; and
   a case having an accommodating space;
   wherein the bottom is disposed in the accommodating space and affixed on the case; and
   wherein the frame is disposed in the accommodating space and affixed on the case.

6. The optical system as claimed in claim 5, wherein:
   an area of the first opening is less than an area of the second opening;
   the extension portion is adjacent to the second opening;
   the extension portion comprises a dodging portion corresponding to the second opening;
   the dodging portion has a shape that gradually shrinks;
   the first surface extends to the extension portion;
   the case comprises metal;
   the bottom comprises plastic; and
   the frame comprises plastic.

7. The optical system as claimed in claim 6, wherein:
   at least a portion of the bottom is disposed in the extension portion;
   the frame is not disposed in the extension portion;
   the bottom comprises a third opening corresponding to the first opening; and
   the third opening has a closed structure.

8. The optical system as claimed in claim 7, further comprising:
   a first optical element movable relative to the fixed portion in a first dimension;
   a second optical element movable relative to the fixed portion in a second dimension; and a second driving assembly used for driving the second optical to move relative to the fixed portion.

9. The optical system as claimed in claim 8, wherein:
the first dimension and the second dimension are different;
when viewed in a third direction, a connection between a center of the first optical element and a center of the second optical element is not parallel to the third axis;
the third direction is parallel to the first axis; and
when viewed in the third direction, the connection between the center of the first optical element and the center of the second optical element is not perpendicular to the third axis.

10. The optical system as claimed in claim 9, wherein:
the first driving assembly is disposed on the bottom;
the second driving assembly is disposed on the frame;
the first driving assembly is not disposed on the frame;
the second driving assembly is not disposed on the bottom; and
at least a portion of the first driving assembly is disposed on the extension portion.

11. The optical system as claimed in claim 10, wherein:
the first dimension is a rotational movement taking a first rotational axis as the rotational axis;
the second dimension is a rotational movement taking a second rotational axis as the rotational axis;
the first rotational axis and the second rotational axis are not parallel;
the first rotational axis and the first axis are not parallel;
the first rotational axis and the second axis are not parallel;
the first rotational axis and the third axis are not parallel; and
the second rotational axis and the first axis are parallel.

12. The optical system as claimed in claim 11, wherein:
the first driving assembly comprises a first coil and a first magnetic element corresponding with each other;
the second driving assembly comprises a second coil and a second magnetic element corresponding with each other;
the first magnetic element is movable relative to the second magnetic element; and
the first magnetic element is not movable relative to the second coil, or the first coil is not movable relative to the second magnetic element.

13. The optical system as claimed in claim 12, further comprising:
a resilient assembly, wherein the first optical element is movably connected to the fixed portion through the resilient assembly; and
a support assembly, wherein the second optical element is movably connected to the fixed portion through the support assembly.

14. The optical system as claimed in claim 13, wherein:
the first rotational axis and the second rotational axis are perpendicular;
the first driving assembly further comprises a first magnetic permeable element and a third magnetic element;
the second driving assembly further comprises a second magnetic permeable element;
the first magnetic permeable element and the second magnetic permeable element are not movable with each other;
the first magnetic permeable element is affixed on the first magnetic element;
the second magnetic permeable element is affixed on the second coil; and
the third magnetic element corresponds to the first coil.

15. The optical system as claimed in claim 14, wherein:
a space is between the first magnetic element and the third magnetic element, and the space corresponds to the second magnetic element;
the first magnetic element is affixed on the fixed portion;
the first optical element is movable relative to the fixed portion through a resilient portion of the resilient assembly;
the resilient portion is flexible;
a first fixed end of the resilient assembly is affixed on the first optical element;
a second fixed end of the resilient assembly is affixed on the fixed portion; and
the support assembly is movable relative to the second optical element or the fixed portion.

16. The optical system as claimed in claim 15, wherein:
the first driving assembly drives the first optical element relative to the fixed portion in a first frequency;
the second driving assembly drives the second optical element relative to the fixed portion in a second frequency range; and
a maximum value of the second frequency range is less than the first frequency.

17. The optical system as claimed in claim 16, wherein:
a first distance is between the center of the first opening and the center of the first optical element;
a second distance is between the center of the second opening and the center of the second optical element;
a third distance is between the center of the first optical element and the center of the second optical element;
the first distance and the second distance are different;
the first distance and the third distance are different;
the second distance and the third distance are different; and
the light sequentially passes through the first opening, the first optical element, the second optical element, and the second opening.

18. The optical system as claimed in claim 17, wherein:
the first frequency is at least 10 times greater than the maximum value of the second frequency range;
the first distance is greater than the second distance;
the first distance is greater than the third distance; and
the second distance is greater than the third distance.

* * * * *